United States Patent
Zhang (10) Patent No.: US 10,412,778 B2
(45) Date of Patent: Sep. 10, 2019

(54) DATA TRANSMISSION METHOD AND APPARATUS FOR DATA SERVICE

(71) Applicant: Huawei Technologies Co., Ltd., Shenzhen (CN)

(72) Inventor: Xiaobo Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 40 days.

(21) Appl. No.: 15/562,036

(22) PCT Filed: Mar. 31, 2015

(86) PCT No.: PCT/CN2015/075587
§ 371 (c)(1),
(2) Date: Sep. 27, 2017

(87) PCT Pub. No.: WO2016/154921
PCT Pub. Date: Oct. 6, 2016

(65) Prior Publication Data
US 2018/0110091 A1    Apr. 19, 2018

(51) Int. Cl.
*H04W 76/19* (2018.01)
*H04W 76/10* (2018.01)
(Continued)

(52) U.S. Cl.
CPC ........... *H04W 76/19* (2018.02); *H04W 24/04* (2013.01); *H04W 28/0236* (2013.01);
(Continued)

(58) Field of Classification Search
CPC ............................ H04W 76/022; H04W 88/06
See application file for complete search history.

(56) References Cited

U.S. PATENT DOCUMENTS 7,324,489 B1 * 1/2008 Iyer .................. H04W 76/12
370/338
7,822,861 B2 * 10/2010 Annic ................. H04W 48/18
709/225
(Continued)

FOREIGN PATENT DOCUMENTS

CN    101977370 A    2/2011
CN    102340891 A    2/2012
(Continued)

OTHER PUBLICATIONS

Nokia Siemens Networks et al.,"APN Congestion Control," XP050522754, S2-105494, 3GPP TSG CT WG1 Meeting #68, C1-104566, Nov. 15-19, 2010, 2 pages.
(Continued)

*Primary Examiner* — Melanie Jagannathan
(74) *Attorney, Agent, or Firm* — Conley Rose, P.C.

(57) ABSTRACT

A data transmission method and apparatus for a data service includes detecting transmission states of all established packet data protocol (PDP) links, and when it is found that a first PDP is abnormal, establishing a new PDP link based on a candidate access point name (APN), to perform data transmission for a data service corresponding to the first PDP link. When data transmission is abnormal, a new PDP link is automatically established without disrupting a previous PDP link thereby implementing PDP link switching which a user is unaware of.

15 Claims, 3 Drawing Sheets

(51) Int. Cl.
*H04W 48/20* (2009.01)
*H04W 76/12* (2018.01)
*H04W 24/04* (2009.01)
*H04W 28/02* (2009.01)
*H04L 12/24* (2006.01)
*H04W 28/04* (2009.01)

(52) U.S. Cl.
CPC .......... *H04W 48/20* (2013.01); *H04W 76/10* (2018.02); *H04W 76/12* (2018.02); *H04L 41/0654* (2013.01); *H04W 28/04* (2013.01)

(56) References Cited

U.S. PATENT DOCUMENTS

| | | | | |
|---|---|---|---|---|
| 8,488,746 | B1* | 7/2013 | Chang | H04L 43/0817 370/252 |
| 2005/0281269 | A1* | 12/2005 | Choi | H04W 76/32 370/395.2 |
| 2012/0082029 | A1 | 4/2012 | Liao | |
| 2012/0307799 | A1 | 12/2012 | Taleb et al. | |
| 2013/0303114 | A1* | 11/2013 | Ahmad | H04W 16/14 455/406 |
| 2014/0241252 | A1* | 8/2014 | Wang | H04W 76/10 370/328 |
| 2014/0289403 | A1* | 9/2014 | Jin | H04L 67/22 709/224 |

FOREIGN PATENT DOCUMENTS

| | | |
|---|---|---|
| CN | 102448112 A | 5/2012 |
| CN | 102448136 A | 5/2012 |
| CN | 102763441 A | 10/2012 |
| CN | 104754579 A | 7/2015 |
| EP | 2440002 A2 | 4/2012 |
| EP | 3136818 A1 | 3/2017 |
| WO | 2011098249 A2 | 8/2011 |

OTHER PUBLICATIONS

"3rd Generation Partnership Project; Technical Specification Group Core Network and Terminals; Numbering, addressing and identification (Release 13)," XP050927705, 3GPP TS 23.003 V13.1.0, Mar. 2015, 92 pages.
Foreign Communication From a Counterpart Application, European Application No. 15886907.3, Extended European Search Report dated Feb. 13, 2018, 11 pages.
Machine Translation and Abstract of Chinese Publication No. CN101977370, Feb. 16, 2011, 19 pages.
Machine Translation and Abstract of Chinese Publication No. CN102448136, May 9, 2012, 23 pages.
Foreign Communication From a Counterpart Application, PCT Application No. PCT/CN2015/075587, English Translation of International Search Report dated Jan. 5, 2016, 2 pages.
Foreign Communication From a Counterpart Application, PCT Application No. PCT/CN2015/075587, English Translation of Written Opinion dated Jan. 5, 2016, 7 pages.
Machine Translation and Abstract of Chinese Publication No. CN104754579, Jul. 1, 2015, 27 pages.
Foreign Communication From a Counterpart Application, Chinese Application No. 201580077798.2, Chinese Office Action dated Apr. 25, 2019, 6 pages.

* cited by examiner

DATA TRANSMISSION METHOD AND APPARATUS FOR DATA SERVICE

CROSS-REFERENCE TO RELATED APPLICATIONS

This application is a national stage application of International Patent Application No. PCT/CN2015/075587, filed on Mar. 31, 2015, which is herein incorporated by reference in its entirety.

TECHNICAL FIELD

The present disclosure relates to the field of communications technologies, and in particular, to a data transmission method and apparatus for a data service.

BACKGROUND

With development of communications technologies, use of data service-related applications on terminal devices becomes more popular, for example, browsing web pages, reading microblogs, and playing online games on terminal devices such as mobile phones and tablet computers. When a user enables any application on a terminal device, the terminal device may establish a packet data protocol (PDP) link by using an access point/access point name (APN) specified by the application or a default APN. The PDP link connects the terminal device and a server corresponding to the application by using a default route corresponding to the terminal device.

There are multiple types of APNs, and each APN is configured with an ANP type. Common APN types include a default type, a multimedia messaging service (MMS) type, a Secure User Plane Location (SUPL) type, and the like. Different APN types are suitable for different service types of applications. For example, the default type is suitable for applications that generally access the Internet, such as a browser, WeChat® (WeChat is a social media application available from TENCENT), and a microblog that access the Internet. The MMS type is suitable for multimedia messages and related applications and the SUPL type is suitable for applications for location services.

However, after a terminal service enables an application and successfully establishes a PDP link by using an APN, due to a network, a signal, a server, and the like, when the terminal device uses the application, problems such as unsmooth data transmission may occur. For example, game buffering is slow, a delay in receiving/transmitting information is long, and page loading fails. Consequently, data transmission efficiency is reduced.

SUMMARY

Embodiments of the present disclosure provide a data transmission method and apparatus for a data service, to resolve a problem in the prior art that data transmission efficiency is reduced after a terminal device successfully establishes a PDP link.

According to a first aspect, a data transmission method for a data service includes detecting a transmission state of each PDP link among all established packet data protocol PDP links, where any one of the PDP links is established, for a data service, based on a default access point APN of an application executing the data service or an APN corresponding to a service type of the data service; when it is determined, according to a detection result, that a transmission state of a first PDP link among the PDP links is abnormal, establishing a new PDP link based on a candidate APN, where the candidate APN supports an APN type of an APN used by the first PDP link; and performing, according to the new PDP link, data transmission for a data service corresponding to the first PDP link.

With reference to the first aspect, in a first possible implementation manner, determining that the transmission state of a first PDP link is abnormal includes receiving application status information fed back by an application executing the data service corresponding to the first PDP link, determining the transmission state of the first PDP link according to the application status information, and determining that the transmission state of the first PDP link is abnormal when the application status information is an abnormal operating state; or parsing a packet that is received based on the first PDP link, determining the transmission state of the first PDP link according to whether the packet includes an error return identifier, and determining that the transmission state of the first PDP link is abnormal when the packet includes the error return identifier; or determining a quantity of retries for all packets that are sent based on the first PDP link within a first specified duration, determining the transmission state of the first PDP link according to the quantity of retries and a specified retry quantity threshold, and determining that the transmission state of the first PDP link is abnormal when the quantity of retries is greater than or equal to the specified retry quantity threshold; or determining an average delay for sending each packet based on the first PDP link within a second specified duration, determining the transmission state of the first PDP link according to the average delay and a specified delay threshold, and determining that the transmission state of the first PDP link is abnormal when the average delay is greater than or equal to the specified delay threshold.

With reference to the first possible implementation manner of the first aspect, in a second possible implementation manner, before establishing a new PDP link based on a candidate APN, the method further includes determining the data service corresponding to the first PDP link, including determining, according to an application that sends an abnormal operating state as application status information, a data service executed by the application, and using the determined data service as the data service corresponding to the first PDP link; or determining, according to a server IP address carried in a packet that is received or sent by the first PDP link, a server corresponding to the IP address, and using a data service executed by the server as the data service corresponding to the first PDP link.

With reference to the second possible implementation manner of the first aspect, in a third possible implementation manner, before establishing a new PDP link based on a candidate APN, the method further includes determining at least one candidate APN of the data service corresponding to the first PDP link, including using another APN that corresponds to a determined service type of the data service corresponding to the first PDP link, other than the APN used by the first PDP link, as the candidate APN.

With reference to the first aspect or any one of the foregoing implementation manners, in a fourth implementation manner, the APN type is any one of the following such as a default type, a MMS type, a SUPL type, a dial-up network (DUN) type, a high priority (HiPri) type, or an Internet protocol (IP) multimedia subsystem (IMS) type.

With reference to the first aspect or any one of the foregoing possible implementation manners of the first aspect, in a fifth possible implementation manner, performing, according to the new PDP link, data transmission for a data service corresponding to the first PDP link includes determining an IP address of the new PDP link, and determining a process identification (PID) of the application executing the data service corresponding to the first PDP link; generating a routing policy based on the PID and the IP address of the new PDP link; and performing, based on the routing policy, data transmission for the data service corresponding to the first PDP link.

According to a second aspect, a data transmission apparatus for a data service includes a detection unit, configured to detect a transmission state of each PDP link among all established PDP links, and determine, according to a detection result, that the transmission state of a first PDP link in the PDP links is abnormal, where any one of the PDP links is established, for a data service, based on a default APN of an application executing the data service or an APN corresponding to a service type of the data service; a processing unit, configured to establish a new PDP link based on a candidate APN, where the candidate APN supports an APN type of an APN used by the first PDP link; and an operating unit, configured to perform, according to the new PDP link, data transmission for a data service corresponding to the first PDP link.

With reference to the second aspect, in a first possible implementation manner, the detection module is specially configured to receive application status information fed back by an application executing the data service corresponding to the first PDP link, determine the transmission state of the first PDP link according to the application status information, and determine that the transmission state of the first PDP link is abnormal when the application status information is an abnormal operating state; or parse a packet that is received based on the first PDP link, determine the transmission state of the first PDP link according to whether the packet includes an error return identifier, and determine that the transmission state of the first PDP link is abnormal when the packet includes the error return identifier; or determine a quantity of retries for all packets that are sent based on the first PDP link within first specified duration, determine the transmission state of the first PDP link according to the quantity of retries and a specified retry quantity threshold, and determine that the transmission state of the first PDP link is abnormal when the quantity of retries is greater than or equal to the specified retry quantity threshold; or determine an average delay for sending each packet based on the first PDP link within second specified duration, determine the transmission state of the first PDP link according to the average delay and a specified delay threshold, and determine that the transmission state of the first PDP link is abnormal when the average delay is greater than or equal to the specified delay threshold.

With reference to the first possible implementation manner of the second aspect, in a second possible implementation manner, the apparatus further includes a first determining unit, configured to determine the data service corresponding to the first PDP link before the new PDP link is established based on the candidate APN, including determining, according to an application that sends an abnormal operating state as application status information, a data service executed by the application, and using the determined data service as the data service corresponding to the first PDP link; or determining, according to a server IP address carried in a packet that is received or sent by the first PDP link, a server corresponding to the IP address, and using a data service executed by the server as the data service corresponding to the first PDP link.

According to the second possible implementation manner of the second aspect, in a third possible implementation manner, the apparatus further includes a second determining unit, configured to determine at least one candidate APN of the data service corresponding to the first PDP link before the new PDP link is established based on the candidate APN, including using another APN that corresponds to a determined service type of the data service corresponding to the first PDP link, other than the APN used by the first PDP link, as the candidate APN.

With reference to any one of the second aspect or the foregoing implementation manners of the second, in a fourth implementation manner, the APN type is any one of the following such as a default type, a MMS type, a SUPL type, a DUN type, a HiPri type, or an IMS type.

With reference to the second aspect or any one of the foregoing implementation manners of the second, in a fifth possible implementation manner, the operating unit is specifically configured to determine an IP address of the new PDP link, and determine a PID of the application executing the data service corresponding to the first PDP link; generate a routing policy based on the PID and the IP address of the new PDP link; and perform, based on the routing policy, data transmission for the data service corresponding to the first PDP link.

In the embodiments of the present disclosure, transmission states of all established PDP links are detected, a candidate APN is selected to establish a new PDP link when it is determined that the transmission state of a first PDP link is abnormal, and data transmission is performed for a data service corresponding to the first PDP link according to the new PDP link. In this way, when data transmission is abnormal, a PDP link having relatively high data transmission efficiency is adaptively established to continue the data transmission without disrupting the existing PDP link, so that data transmission efficiency and user experience are improved without affecting use by a user.

DESCRIPTION OF EMBODIMENTS

To make the objectives, technical solutions, and advantages of the present disclosure clearer, the following further describes the present disclosure in detail with reference to the accompanying drawings. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a data transmission method and apparatus for a data service, to resolve a problem in the prior art that data transmission efficiency is reduced after a terminal device successfully establishes a PDP link. The method and the apparatus are based on a same inventive concept. A problem-resolving principle of the method is similar to that of the apparatus. Therefore, mutual reference may be made between implementation of the apparatus and implementation of the method. Repeated parts are not described again.

In the prior art, when a terminal device enables an application and successfully establishes a PDP link to perform data transmission for a data service, if abnormal data transmission occurs, the terminal device cannot perform adjustment. Consequently, data transmission efficiency is reduced, and user experience is also reduced. However, by using the technical solution of the present disclosure, transmission states of all currently established PDP links are detected. When it is determined that the transmission state of a first PDP link is abnormal, a candidate APN of a same type is selected to establish a new PDP link, and the data transmission is continued for the data service corresponding to the first PDP link according to the new PDP link. In this way, when data transmission is abnormal, a PDP link having relatively high data transmission efficiency is adaptively established to continue the data transmission without disrupting an existing PDP link. The data transmission efficiency and the user experience are improved without affecting use by a user.

The embodiments of the present disclosure provide a data transmission method and apparatus for a data service, which are suitable for terminal devices on which applications for processing various types of data services are deployed, for example, smart phones and tablet computers. The following describes implementation manners of the present disclosure in detail with reference to the accompanying drawings.

Figure 1:
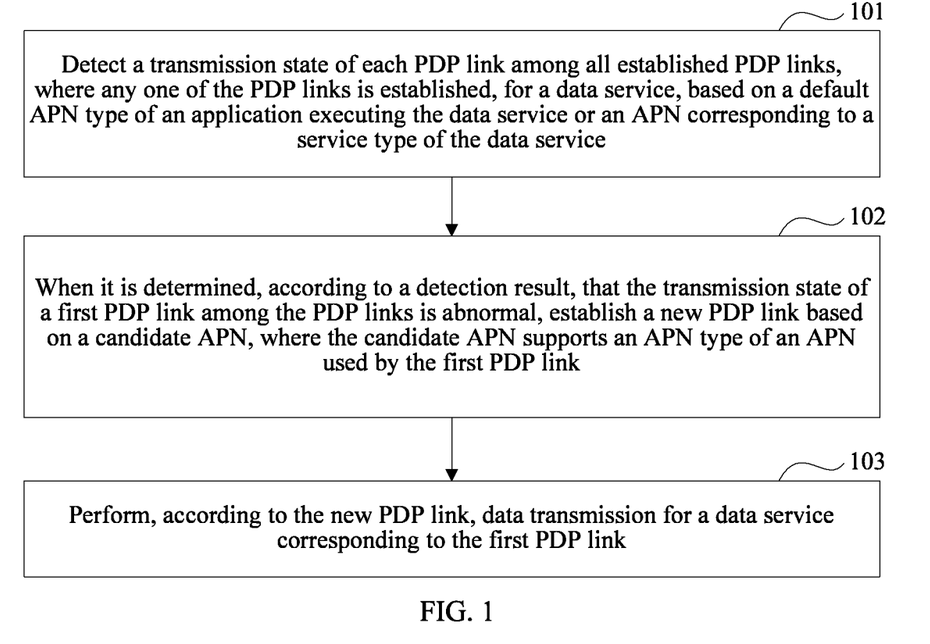
FIG. 1 is a flowchart of a data transmission method for a data service according to an embodiment of the present disclosure.

A data transmission method for a data service provided in an embodiment of the present disclosure may, but is not limited to, be used in a $3^{rd}$ Generation (3G) or a Long Term Evolution (LTE) network. Referring to FIG. 1, a specific process of the method includes the following steps.

Step 101: Detect a transmission state of each PDP link among all established PDP links, where any one of the PDP links is established, for a data service, based on a default APN type of an application executing the data service or an APN corresponding to a service type of the data service.

First, when enabling an application to start a data service of the application, a terminal device may establish a PDP link by using a default APN of the application or an APN specified by the application according to a service type of the data service. Generally, the application may specify an APN type according to the service type of the data service. Therefore, an APN corresponding to the service type of the data service is an APN supporting the APN type specified by the application. When the application does not specify an APN type, an APN of a default (default) type is selected.

For example, if a microblog application is enabled on a mobile phone, and the microblog application does not specify an APN type, a default APN (a default-type APN) is used to establish a PDP link. A multimedia message application is enabled on a mobile phone, and because the multimedia message application specifies that the APN type is MMS, the terminal device needs to use an APN supporting the MMS type, to establish a PDP link.

The terminal device may detect the transmission state of each PDP link by using a specified period, or may detect the transmission state of each PDP link when a user designates a detection or at a specified time point.

Specifically, detecting the transmission state of each PDP link includes the following manners.

In a first manner, receive application status information fed back by an application executing each data service, and determine the transmission state of each PDP link according to the application status information.

In a second manner, parse a packet that is received based on each PDP link, and determine the transmission state of each PDP link according to whether the packet includes an error return identifier.

In a third manner, determine a quantity of retries for all packets that are sent based on each PDP link within a first specified duration, and determine the transmission state of each PDP link according to the quantity of retries and a specified retry quantity threshold.

In a fourth manner, determine an average delay for sending each packet based on each PDP link within a second specified duration, and determine the transmission state of each PDP link according to the average delay and a specified delay threshold.

For the first manner, when the terminal device enables an application to execute a corresponding data service, for example, open a web page by using a browser application, the terminal device may monitor the application, and the application also feeds back application status information to the terminal device. In a case in which the web page cannot be opened or server connection fails, the application feeds back an abnormal operating status as application status information to the terminal device. Therefore, the terminal device may determine a transmission state of a PDP link according to the received application status information that is fed back by the application.

For the second manner, when a server sends a packet for a data service, if an error occurs in the server, the server determines a corresponding error return value according to causes of errors specified in the Hyper Text Transport Protocol (HTTP), and adds the error return value to the packet that is sent. Therefore, when an error occurs during sending of a packet or occurs in a network, the terminal device may determine a transmission state of a PDP link by parsing a received packet.

For the third manner, when the terminal device performs data transmission according to the HTTP protocol, after a packet is sent, if a response packet corresponding to the packet is received within a specified period of time, the terminal device confirms that sending of the packet succeeds; or, if a response packet corresponding to the packet is not received within a specified period of time, the terminal device confirms that sending of the packet fails, and sends the packet again until the packet is successfully sent. Therefore, the terminal device records a quantity of retransmissions of each packet. Therefore, the terminal device may count a quantity of retries for all packets that are sent based on a PDP link within a first specified period of time (such as 60 seconds or 90 seconds), that is, a quantity of retries for each packet that is retransmitted, and compare the quantity with a specified retry quantity threshold, to determine a transmission state of a PDP link. The specified retry quantity threshold is set by a system, or is set by a user according to an empirical value. A specific value of the retry quantity threshold is not limited in the present disclosure.

For the fourth manner, according to the description of the third manner, it can be known that a terminal device confirms that sending of a packet succeeds after sending a packet and receiving a response packet corresponding to the packet. A period of time from sending of a packet by the terminal device to receiving of a response packet corresponding to the packet is a delay time for sending the packet by the terminal device. The terminal device may record the delay time for sending each packet, and collect statistics on an average delay for sending each packet based on a PDP link within a second specified period of time. The average delay is obtained by dividing a total delay time of all packets that are sent within the second specified period of time by a quantity of all packets that are sent.

Step 102: When it is determined, according to a detection result, that a transmission state of a first PDP link among the PDP links is abnormal, establish a new PDP link based on a candidate APN, where the candidate APN supports an APN type of an APN used by the first PDP link.

Specifically, determining that the transmission state of a first PDP link is abnormal based on a specific description of the detecting a transmission state of each PDP link in step 101 includes receiving application status information fed back by an application executing the data service corresponding to the first PDP link, determining the transmission state of the first PDP link according to the application status information, and determining that the transmission state of the first PDP link is abnormal when the application status information is an abnormal operating state or parsing a packet that is received based on the first PDP link, determining the transmission state of the first PDP link according to whether the packet includes an error return identifier, and determining that the transmission state of the first PDP link is abnormal when the packet includes the error return identifier; or determining a quantity of retries for all packets that are sent based on the first PDP link within the first specified duration, determining the transmission state of the first PDP link according to the quantity of retries and a specified retry quantity threshold, and determining that the transmission state of the first PDP link is abnormal when the quantity of retries is greater than or equal to the specified retry quantity threshold; or determining an average delay for sending each packet based on the first PDP link within second specified duration, determining the transmission state of the first PDP link according to the average delay and a specified delay threshold, and determining that the transmission state of the first PDP link is abnormal when the average delay is greater than or equal to the specified delay threshold.

Optionally, the candidate APN supports an APN type of an APN used by the first PDP link. The candidate APN is an APN supporting a type same as the APN type specified by the application.

Each APN is configured with an APN type, and one APN may be configured with one or more APN types. For example, an APN type configured for one APN is a default type, and APN types configured for one APN are a default type and an MMS type.

Optionally, before establishing a new PDP link based on a candidate APN, the method further includes determining the data service corresponding to the first PDP link, including determining, according to an application that sends an abnormal operating state as application status information, a data service executed by the application, and using the determined data service as the data service corresponding to the first PDP link; or determining, according to a server IP address carried in a packet that is received or sent by the first PDP link, a server corresponding to the IP address, and using a data service executed by the server as the data service corresponding to the first PDP link.

Optionally, before establishing a new PDP link based on a candidate APN, the method further includes determining at least one candidate APN of the data service corresponding to the first PDP link, specifically including using another APN that corresponds to a determined service type of the data service corresponding to the first PDP link, other than the APN used by the first PDP link, as the candidate APN.

Specifically, determining at least one candidate APN of the data service corresponding to the first PDP link may be performed after the first PDP link is established for the data service, or may be performed after it is determined that the transmission state of the first PDP link is abnormal. This is not limited in this embodiment of the present disclosure.

The APN type is any one of the following such as a default type, a MMS type, a SUPL type, a DUN type, a HiPri type, or an IMS type.

Specifically, if multiple APNs are configured for an application executing a current data service in the terminal device, and the application specifies one APN type, the application performs, according to the specified APN type, matching on the multiple APNs configured in the terminal device, and determines that multiple APNs matching the APN type specified by the application are configured. The APN used by the first PDP link is any one or a specified one of the determined multiple APNs (for example, the application or the terminal device selects, among the multiple APNs according to historical records, an APN that is used for the most quantity of times), and other APNs of the same type are candidate APNs.

Specifically, establishing a new PDP link based on a candidate APN includes activating a PDP context by using the candidate APN, and initiating a packet data service call, to establish the new PDP link.

Step 103: Perform, according to the new PDP link, data transmission for a data service corresponding to the first PDP link.

Specifically, performing step 103 includes determining an IP address of the new PDP link, and determining a PID of the application executing the data service corresponding to the first PDP link; generating a routing policy based on the PID and the IP address of the new PDP link; and performing, based on the routing policy, data transmission for the data service corresponding to the first PDP link.

Each PDP link has a unique corresponding IP address. The terminal device generates a routing policy based on an IP address of the new PDP link and a PID of an application executing a current data service, so that a packet from or to the PID may be transmitted by using a specified routing path. By using the routing policy, only an application corresponding to the PID can use the new PDP link to perform data transmission, and data of another application cannot be transmitted by using the new PDP link. In this way, a specified application may use a specified PDP link without affecting a PDP link of another application.

In Wide-band Code Division Multiple Access (WCDMA), Time Division Multiple Access (TD-CDMA), LTE, and evolved high rate packet data (EHRPD) networks, the terminal device is allowed to use multiple APNs configured with different APN types, to establish multiple PDP links simultaneously. Different applications may use different APNs to establish PDP links to perform data services. For example, when using a browser application, the terminal device establishes a PDP link to surf the Internet by using a default-type APN, and at the same time, the terminal device uses a multimedia message application, and establishes a PDP link to send a multimedia message by using an MMS-type APN.

By using the method, transmission states of all established PDP links are detected. When an error is found, a new PDP link is established based on a candidate APN, to perform data transmission for a data service corresponding to a PDP link on which the error occurs. In this way, when an error occurs during data transmission, a new PDP link is automatically established without disrupting a previous PDP link, implementing PDP link switching which a user is unaware of, so that the user may use a PDP link having relatively high transmission efficiency. Besides, it is ensured that different applications may use different and more reasonable PDP links, to improve user experience. However, in the prior art, only in a case in which establishment of a PDP link by using an APN fails, another APN of a same type can be used to establish a PDP link, and only one PDP link of a same type can be established each time. Therefore, when multiple applications are enabled at the same time, data services of other applications are affected, affecting use by the user.

Figure 2:
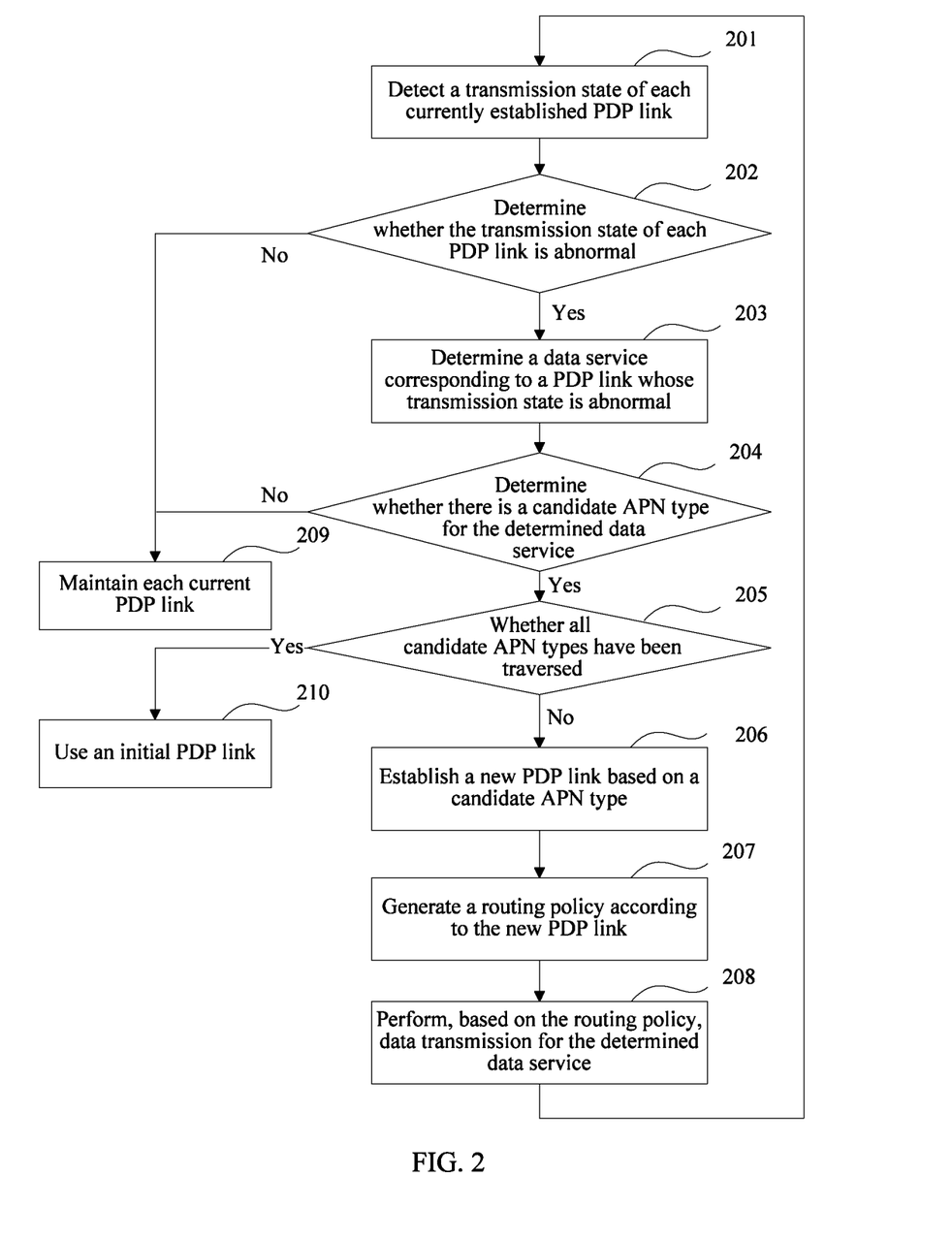
FIG. 2 is a flowchart of details of a data transmission method for a data service according to an embodiment of the present disclosure.

Based on the above embodiment, referring to FIG. 2, an embodiment of the present disclosure further provides a detailed process of a data transmission method for a data service. The method is applied to a terminal device, and includes the following steps.

Step 201: Detect a transmission state of each currently established PDP link.

When a terminal device enables an application to start processing a data service corresponding to the application, the terminal device establishes a PDP link by using a default APN of the terminal device or an APN corresponding to a service type of the data service (that is, an APN configured with an APN type specified by the application), and then performs the data service corresponding to the application by using the PDP link.

The transmission state of each PDP link may change with time. The terminal device may periodically detect the transmission state of each PDP link.

Specifically, detecting a transmission state of each currently established PDP link includes the following manners.

In a first manner, receive application status information fed back by an application executing each data service, and determine the transmission state of each PDP link according to the application status information.

In a second manner, parse a packet that is received based on each PDP link, and determine the transmission state of each PDP link according to whether the packet includes an error return identifier.

In a third manner, separately determine a quantity of retries for all packets that are sent based on each PDP link within a first specified period of time, and determine the transmission state of each PDP link according to the quantity of retries and a specified retry quantity threshold.

In a fourth manner, separately determine an average delay for sending each packet based on each PDP link within a second specified period of time, and determine the transmission state of each PDP link according to the average delay and a specified delay threshold.

Step 202: Determine whether the transmission state of each PDP link is abnormal, and if yes, perform step 203; or otherwise, perform step 209.

According to the description of the several manners of detecting a transmission state of each currently established PDP link in step 201, determining whether the transmission state of a PDP link is abnormal includes when received application status information that is fed back by an application executing a data service is an abnormal operating state, determining that the transmission state of the PDP link that is established for the data service is abnormal; or parsing a packet that is received based on the PDP link, and determining that the transmission state of the PDP link is abnormal when the packet includes an error return identifier; or determining a quantity of retries for all packets that are sent based on the PDP link within a first specified period of time, and determining that the transmission state of the PDP link is abnormal when the quantity of retries is greater than or equal to a specified retry quantity threshold; or determining an average delay for sending each packet based on the PDP link within a second specified period of time, and determining that the transmission state of the PDP link is abnormal when the average delay is greater than or equal to a specified delay threshold.

Step 203: Determine a data service corresponding to a PDP link whose transmission state is abnormal.

In step 202, it may be determined that the transmission states of multiple PDP links are abnormal. Subsequent operations for each abnormal PDP link include step 204 to step 210. In this embodiment, operations are performed on only one PDP link whose transmission state is abnormal, and operations on other PDP links whose transmission states are abnormal are the same as step 204 to step 210. Details are not described in this embodiment.

Specifically, in the first manner of the detecting a transmission state of each currently established PDP link in step 201, a detection mechanism is established between the terminal device and an application, and the terminal device may receive application status information fed back by the application. Therefore, when the application status information received by the terminal device is an abnormal operating state, the terminal device may directly determine an application for sending the application status information, and therefore determine a data service executed by the application.

In the second to the fourth manners, the transmission state is detected according to a packet transmitted by each PDP link, and the packet transmitted by each PDP link carries an IP address of a server connected to each PDP link. Therefore, when it is determined that a transmission state of a PDP link is abnormal in the second to the fourth manners, according to a server IP address carried in a packet transmitted by the PDP link, a data service executed by a server corresponding to the IP address may be determined, and therefore the data service corresponding to the PDP link whose transmission state is abnormal is determined.

Step 204: Determine whether there is a candidate APN for the determined data service, and if yes, perform step 205; or otherwise perform step 209.

The candidate APN is another APN that corresponds to a service type of the determined data service and that is of a same type as the APN used by the PDP link whose transmission state is abnormal.

Step 205: Whether all candidate APNs have been traversed, and if yes, perform step 210; or otherwise perform step 206.

When all candidate APNs have been traversed, it indicates that transmission states of PDP links established by all candidate APNs are also abnormal. In this case, an initial PDP link, that is, a PDP link established when an application is enabled, is generally used. When not all candidate APNs have been traversed, an APN not used is selected to establish a new PDP link.

Step 206: Establish a new PDP link based on a candidate APN.

Specifically, the establishing a new PDP link based on a candidate APN includes activating a PDP context using the candidate APN and initiating a packet data service call, to establish the new PDP link. The candidate APN is a candidate APN that is not traversed.

Step 207: Generate a routing policy according to the new PDP link.

Specifically, performing step 207 includes determining an IP address of the new PDP link; and determining a PID of a data service that is currently executed, and generating a routing policy based on the PID and the IP address of the new PDP link.

By using the routing policy, a specified application may use a specified PDP link without affecting a PDP link of another application.

Step 208: Perform, based on the routing policy, data transmission for the determined data service.

In this case, the terminal device uses the new PDP link as a current PDP link to perform data transmission. Thereafter, the terminal device further needs to continue to perform step 201.

Step 209: When the transmission state of each PDP link is normal, or there is a PDP link whose transmission state is abnormal but no candidate APN is available for a data service corresponding to the PDP link, maintain each current PDP link to perform data transmission.

Step 210: Use an initial PDP link when there is a candidate APN but the candidate APN has been traversed.

When all candidate APNs have been traversed, it indicates that transmission states of PDP links established by all the candidate APNs are also abnormal. In this case, an initial PDP link, that is, a PDP link established when an application is enabled, is generally used.

By using the method in this embodiment of the present disclosure, a terminal device simultaneously detects transmission states of all established PDP links, and when finding that a PDP link is abnormal, establishes a new PDP link based on a candidate APN of a data service corresponding to each PDP link, to perform data transmission. In this way, when data transmission is abnormal, a new PDP link is automatically established without disrupting a previous PDP link, implementing PDP link switching which a user is unaware of, so that the user may use a PDP link having relatively high transmission efficiency. Besides, it is ensured that different applications may use different and more reasonable PDP links, to improve user experience. However, in the prior art, only in a case in which establishment of a PDP link by using an APN fails, another APN of a same type can be used to establish a PDP link, and only one PDP link of a same type can be established each time. Therefore, when multiple applications are enabled at the same time, data services of other applications are affected, affecting use by the user.

Figure 3:
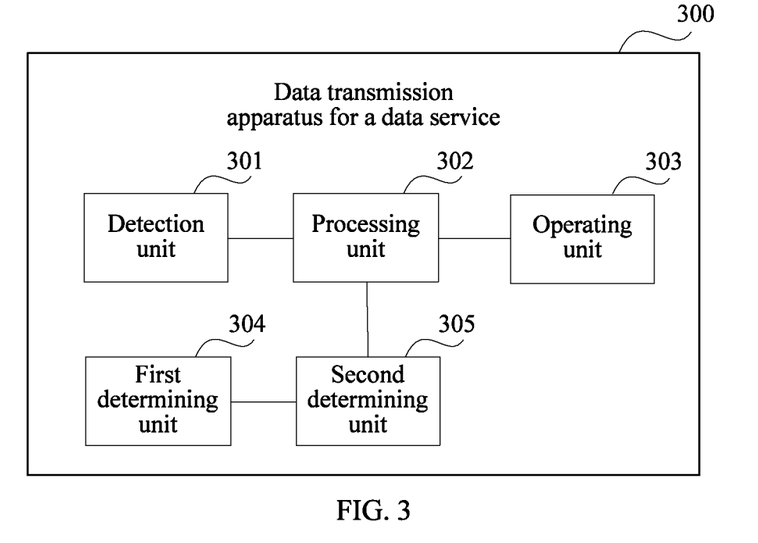
FIG. 3 is a schematic structural diagram of a data transmission apparatus for a data service according to an embodiment of the present disclosure.

Based on the foregoing embodiment, referring to FIG. 3, an embodiment of the present disclosure further provides a data transmission apparatus 300 for a data service. The apparatus includes a detection unit 301, a processing unit 302, and an operating unit 303.

The detection unit 301 is configured to detect a transmission state of each PDP link among all established packet data protocol PDP links, and determine, according to a detection result, that the transmission state of a first PDP link in the PDP links is abnormal, where any one of the PDP links is established, for a data service, based on a default access point APN of an application executing the data service or an APN corresponding to a service type of the data service.

The processing unit 302 is configured to establish a new PDP link based on a candidate APN, where the candidate APN supports an APN type of an APN used by the first PDP link.

The operating unit 303 is configured to perform data transmission for the data service according to the new PDP link established by the processing unit 302.

Optionally, the detection unit 301 is specifically configured to receive application status information fed back by an application executing the data service corresponding to the first PDP link, determine the transmission state of the first PDP link according to the application status information, and determine that the transmission state of the first PDP link is abnormal when the application status information is an abnormal operating state; or parse a packet that is received based on the first PDP link, determine the transmission state of the first PDP link according to whether the packet includes an error return identifier, and determine that the transmission state of the first PDP link is abnormal when the packet includes the error return identifier; or determine a quantity of retries for all packets that are sent based on the first PDP link within first specified duration, determine the transmission state of the first PDP link according to the quantity of retries and a specified retry quantity threshold, and determine that the transmission state of the first PDP link is abnormal when the quantity of retries is greater than or equal to the specified retry quantity threshold; or determine an average delay for sending each packet based on the first PDP link within second specified duration, determine the transmission state of the first PDP link according to the average delay and a specified delay threshold, and determine that the transmission state of the first PDP link is abnormal when the average delay is greater than or equal to the specified delay threshold.

Optionally, the data transmission apparatus 300 for a data service further includes a first determining unit 304, configured to determine the data service corresponding to the first PDP link before the new PDP link is established based on the candidate APN, including determining, according to an application that sends an abnormal operating state as application status information, a data service executed by the application, and using the determined data service as the data service corresponding to the first PDP link; or determining, according to a server IP address carried in a packet that is received or sent by the first PDP link, a server corresponding to the IP address, and using a data service executed by the server as the data service corresponding to the first PDP link.

Optionally, the data transmission apparatus 300 for a data service further includes a second determining unit 305, configured to determine at least one candidate APN of the data service corresponding to the first PDP link before the new PDP link is established based on the candidate APN, including using another APN that corresponds to a determined service type of the data service corresponding to the first PDP link, other than the APN used by the first PDP link, as the candidate APN.

Optionally, the APN type is any one of the following. A default type, a MMS type, a SUPL type, a DUN type, a HiPri type, or an IMS type.

The operating unit 303 is specifically configured to determine an IP address of the new PDP link, and determine a PID of the application executing the data service corresponding to the first PDP link; generate a routing policy based on the PID and the IP address of the new PDP link; and perform, based on the routing policy, data transmission for the data service corresponding to the first PDP link.

Figure 4:
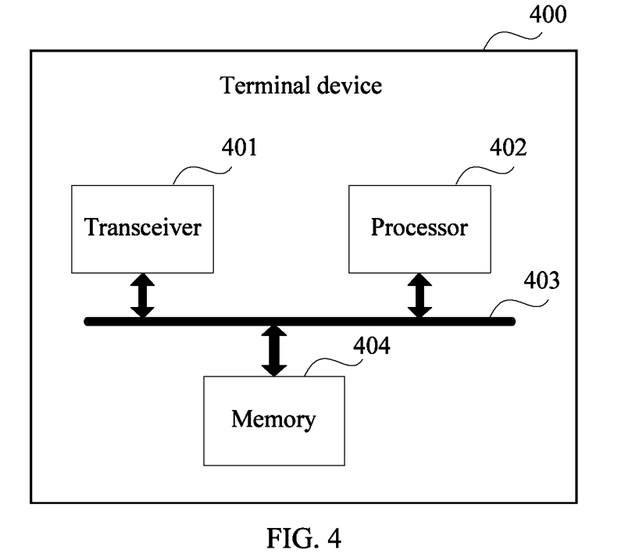
FIG. 4 is a schematic structural diagram of a terminal device according to an embodiment of the present disclosure.

Based on the foregoing embodiment, an embodiment of the present disclosure further provides a terminal device 400. The terminal device 400 is a terminal device on which applications that process various types of data services are deployed, for example, a smart phone, or a tablet computer.

Referring to FIG. 4, the terminal device 400 includes a transceiver 401, a processor 402, a bus 403, and a memory 404.

The transceiver 401, the processor 402, and the memory 404 are connected to each other by using the bus 403. The bus 403 may be a peripheral component interconnect (PCI) bus, an extended industry standard architecture (EISA) bus, or the like. The bus may be classified into an address bus, a data bus, a control bus, or the like. For convenience of representation, only one bold line is used for representation in FIG. 4, but it does not represent that there is only one bus or one type of bus.

The transceiver 401 is configured to communicate with another connected device, for example, perform data transmission for a data service based on an established PDP link.

The processor 402 is configured to implement the data transmission method for a data service shown in FIG. 1 according to an embodiment of the present disclosure, including detecting a transmission state of each PDP link among all established PDP links, where any one of the PDP links is established, for a data service, based on a default access point APN of an application executing the data service or an APN corresponding to a service type of the data service; when it is determined, according to a detection result, that a transmission state of a first PDP link among the PDP links is abnormal, establishing a new PDP link based on a candidate APN, where the candidate APN supports an APN type of an APN used by the first PDP link; and performing, according to the new PDP link, data transmission for a data service corresponding to the first PDP link.

Optionally, the determining that the transmission state of a first PDP link is abnormal includes receiving application status information fed back by an application executing the data service corresponding to the first PDP link, determining the transmission state of the first PDP link according to the application status information, and determining that the transmission state of the first PDP link is abnormal when the application status information is an abnormal operating state; or parsing a packet that is received based on the first PDP link, determining the transmission state of the first PDP link according to whether the packet includes an error return identifier, and determining that the transmission state of the first PDP link is abnormal when the packet includes the error return identifier; or determining a quantity of retries for all packets that are sent based on the first PDP link within first specified duration, determining the transmission state of the first PDP link according to the quantity of retries and a specified retry quantity threshold, and determining that the transmission state of the first PDP link is abnormal when the quantity of retries is greater than or equal to the specified retry quantity threshold; or determining an average delay for sending each packet based on the first PDP link within a second specified duration, determining the transmission state of the first PDP link according to the average delay and a specified delay threshold, and determining that the transmission state of the first PDP link is abnormal when the average delay is greater than or equal to the specified delay threshold.

Optionally, before the establishing of a new PDP link based on a candidate APN, the method further includes determining the data service corresponding to the first PDP link, including determining, according to an application that sends an abnormal operating state as application status information, a data service executed by the application, and using the determined data service as the data service corresponding to the first PDP link; or determining, according to a server IP address carried in a packet that is received or sent by the first PDP link, a server corresponding to the IP address, and using a data service executed by the server as the data service corresponding to the first PDP link.

Optionally, before the establishing of a new PDP link based on a candidate APN, the method further includes determining at least one candidate APN of the data service corresponding to the first PDP link, including using another APN that corresponds to a determined service type of the data service corresponding to the first PDP link, other than the APN used by the first PDP link, as the candidate APN.

Optionally, the APN type is any one of the following such as a default type, a MMS type, a SUPL type, a DUN type, a HiPri type, or an IMS type.

Optionally, the performing, according to the new PDP link, data transmission for a data service corresponding to the first PDP link includes determining an IP address of the new PDP link, and determining a PID of the application executing the data service corresponding to the first PDP link; generating a routing policy based on the PID and the IP address of the new PDP link; and performing, based on the routing policy, data transmission for the data service corresponding to the first PDP link.

The terminal device 400 further includes the memory 404 that is configured to store a program. Specifically, the program may include program code, where the program code includes a computer operation instruction. The memory 404 may include a random access memory (RAM), or may further include a non-volatile memory such as at least one disk memory. The processor 402 executes an application program stored in the memory 404, to implement the data transmission method for a data service.

Based on the above, by using the data transmission method and apparatus for a data service in the embodiments of the present disclosure, transmission states of all established PDP links are detected, a candidate APN is selected to establish a new PDP link when it is determined that the transmission state of a first PDP link is abnormal, and data transmission is performed for the data service according to the new PDP link. In this way, when data transmission is abnormal, a PDP link having relatively high data transmission efficiency is adaptively established to continue the data transmission without disrupting the existing PDP link, so that data transmission efficiency and user experience are improved without affecting use by a user.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable or readable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A data transmission method for a data service, comprising:
    detecting a transmission state of each packet data protocol (PDP) link among all PDP links that is established for a data service, wherein any one of the PDP links is established for the data service based on either a default access point name (APN) of an application executing the data service or an APN corresponding to a service type of the data service;
    receiving application status information for an application executing a first data service corresponding to a first PDP link;
    determining a transmission state of the first PDP link according to the application status information;
    determining that the transmission state of the first PDP link is abnormal when the application status information is in an abnormal operating state;
    establishing a new PDP link based on a candidate APN when the transmission state of the first PDP link is abnormal, wherein the candidate APN supports an APN type of an APN used by the first PDP link; and
    transmitting, according to the new PDP link, data for the first data service corresponding to the first PDP link.

2. The method of claim 1, wherein before establishing the new PDP link based on the candidate APN, the method further comprises determining the first data service corresponding to the first PDP link, by:
    determining, according to a server internet protocol (IP) address carried in a packet that is received or sent by the first PDP link, a server corresponding to the IP address; and
    using a second data service executed by the server as the first data service corresponding to the first PDP link.

3. The method of claim 1, wherein before establishing the new PDP link based on the candidate APN, the method further comprises:
    determining at least one candidate APN of the first data service corresponding to the first PDP link; and
    using another APN that corresponds to a service type of the first data service corresponding to the first PDP link, other than the APN used by the first PDP link, as the candidate APN.

4. The method of claim 1, wherein the APN type is any one of a default type, a multimedia messaging service (MMS) type, a Secure User Plane Location (SUPL) type, a dial-up network (DUN) type, a high priority (HiPri) type, or an internet protocol multimedia subsystem (IMS) type.

5. The method of claim 1, wherein transmitting, according to the new PDP link, the data for the first data service corresponding to the first PDP link comprises:
    determining an Internet Protocol (IP) address of the new PDP link;
    determining a process identification (PID) of the application executing the data service corresponding to the first PDP link;
    generating a routing policy based on the PID and the IP address of the new PDP link; and
    transmitting, based on the routing policy, the data for the first data service corresponding to the first PDP link.

6. A non-transitory computer-readable medium including at least one computer program code stored therein for data transmission service on a device associated with a computing device wherein when executed on a processor, the non-transitory computer-readable medium causes the processor to be configured to:
    detect a transmission state of each packet data protocol (PDP) link among all PDP links that are established for a data service, wherein any of the PDP links is established for the data service based on either a default access point name (APN) of an application executing the data service or an APN corresponding to a service type of the data service;
    receive application status information for an application executing a first data service corresponding to a first PDP link;
    determine a transmission state of the first PDP link according to the application status information;
    determine that the transmission state of the first PDP link is abnormal when the application status information is an abnormal operating state;
    establish a new PDP link based on a candidate APN when the transmission state of the first PDP link among the PDP links is abnormal, wherein the candidate APN supports an APN type of an APN used by the first PDP link; and
    transmit, according to the new PDP link, data for the first data service corresponding to the first PDP link.

7. The non-transitory computer-readable medium of claim 6, wherein the non-transitory computer-readable medium further causes the processor to be configured to determine the first data service corresponding to the first PDP link, by:

determining, according to a server internet protocol (IP) address carried in a packet that is received or sent by the first PDP link, a server corresponding to the IP address; and using a second data service executed by the server as the first data service corresponding to the first PDP link.

8. The non-transitory computer-readable medium of claim 6, wherein before establishing the new PDP link based on the candidate APN, the non-transitory computer-readable medium further causes the processor to be configured to:

determine at least one candidate APN of the first data service corresponding to the first PDP link;

use another APN that corresponds to a service type of the first data service corresponding to the first PDP link, other than the APN used by the first PDP link, as the candidate APN.

9. The non-transitory computer-readable medium of claim 6, wherein the APN type is any one of a default type, a multimedia messaging service (MMS) type, a Secure User Plane Location (SUPL) type, a dial-up network (DUN) type, a high priority (HiPri) type, or an internet protocol multimedia subsystem (IMS) type.

10. The non-transitory computer-readable medium of claim 6, wherein the non-transitory computer-readable medium further causes the processor to be configured to:

determine an Internet Protocol (IP) address of the new PDP link;

determine a process identification (PID) of the application executing the data service corresponding to the first PDP link;

generate a routing policy based on the PID and the IP address of the new PDP link; and transmit, based on the routing policy, data for the first data service corresponding to the first PDP link.

11. A terminal comprising:

a memory comprising instructions;

a processor coupled to the memory, wherein the instructions cause the processor to be configured to:

detect a transmission state of each packet data protocol (PDP) link among all PDP links that are established for a data service, wherein any of the PDP links is established for the data service based on either a default access point name (APN) of an application executing the data service or an APN corresponding to a service type of the data service;

receive application status information from an application executing a first data service corresponding to a first PDP link;

determine a transmission state of the first PDP link according to the application status information;

determine that the transmission state of the first PDP link is abnormal when the application status information is an abnormal operating state;

establish a new PDP link based on a candidate APN when the transmission state of the first PDP link among the PDP links is abnormal, wherein the candidate APN supports an APN type of an APN used by the first PDP link; and transmit, according to the new PDP link, data for the first data service corresponding to the first PDP link.

12. The terminal of claim 11, wherein before establishing the new PDP link based on the candidate APN, the instructions further cause the processor to be configured to:

determine, according to a server internet protocol (IP) address carried in a packet that is received or sent by the first PDP link, a server corresponding to the IP address, and use a second data service executed by the server as the first data service corresponding to the first PDP link.

13. The terminal of claim 11, wherein before establishing the new PDP link based on the candidate APN, the instructions further cause the processor to be configured to:

determine at least one candidate APN of the first data service corresponding to the first PDP link; and use another APN that corresponds to a service type of the first data service corresponding to the first PDP link, other than the APN used by the first PDP link, as the candidate APN.

14. The terminal of claim 11, wherein the APN type is any one of a default type, a multimedia messaging service (MMS) type, a Secure User Plane Location (SUPL) type, a dial-up network (DUN) type, a high priority (HiPri) type, or an internet protocol multimedia subsystem (IMS) type.

15. The terminal of claim 11, wherein the instructions further cause the processor to be configured to:

determine an Internet Protocol (IP) address of the new PDP link;

determine a process identification (PID) of the application executing the data service corresponding to the first PDP link;

generate a routing policy based on the PID and the IP address of the new PDP link; and transmit, based on the routing policy, the data for the first data service corresponding to the first PDP link.

* * * * *